(12) United States Patent
Garrick

(10) Patent No.: US 12,609,296 B2
(45) Date of Patent: Apr. 21, 2026

(54) METHOD FOR REDUCING NON-UNIFORM ELECTRODE COATING DEGRADATION AND BATTERY CELLS COMPRISING THE SAME

(71) Applicant: GM GLOBAL TECHNOLOGY OPERATIONS LLC, Detroit, MI (US)

(72) Inventor: Taylor R. Garrick, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 553 days.

(21) Appl. No.: 18/166,819

(22) Filed: Feb. 9, 2023

(65) Prior Publication Data

US 2024/0274782 A1 Aug. 15, 2024

(51) Int. Cl.
*H01M 4/139* (2010.01)
*H01M 4/04* (2006.01)
*H01M 50/107* (2021.01)

(52) U.S. Cl.
CPC ......... *H01M 4/139* (2013.01); *H01M 4/0404* (2013.01); *H01M 4/0435* (2013.01); *H01M 50/107* (2021.01)

(58) Field of Classification Search
None
See application file for complete search history.

(56) References Cited

U.S. PATENT DOCUMENTS

2015/0325877 A1* 11/2015 Nizou ................. H01M 4/0404
429/162
2023/0074353 A1* 3/2023 Du .................... H01M 10/0525

* cited by examiner

*Primary Examiner* — Scott J. Chmielecki
(74) *Attorney, Agent, or Firm* — Quinn IP Law

(57) ABSTRACT

A method of reducing non-uniform degradation in a battery cell comprising: determining a likely temperature distribution for the battery cell; determining a temperature profile of the battery cell; calculating an electrochemical reaction rate in the battery cell; determining at least one non-uniformity in the electrochemical reaction rate; inducing a non-uniformity in at least one electrode design characteristic to counteract the at least one non-uniformity in the electrochemical reaction rate; and including at least one electrode having the non-uniformity in at least one electrode design characteristic in the battery cell to drive a more uniform electrochemical reaction rate through the battery cell, which could result in decreased fatigue life, particle stress and degradation of the battery cell during, for example, but not limited to high rate operation.

20 Claims, 2 Drawing Sheets

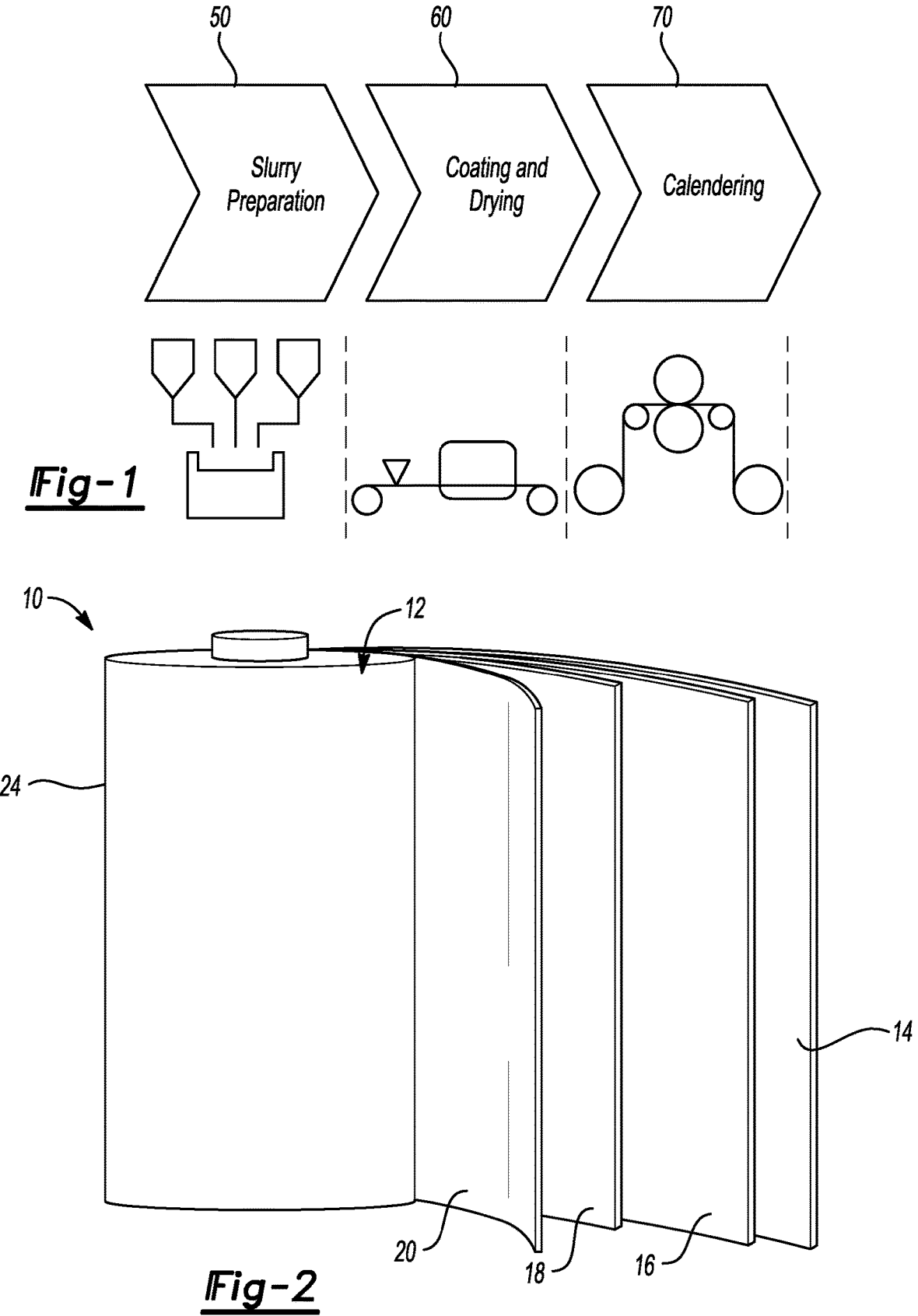
_Fig-1_
_Fig-2_

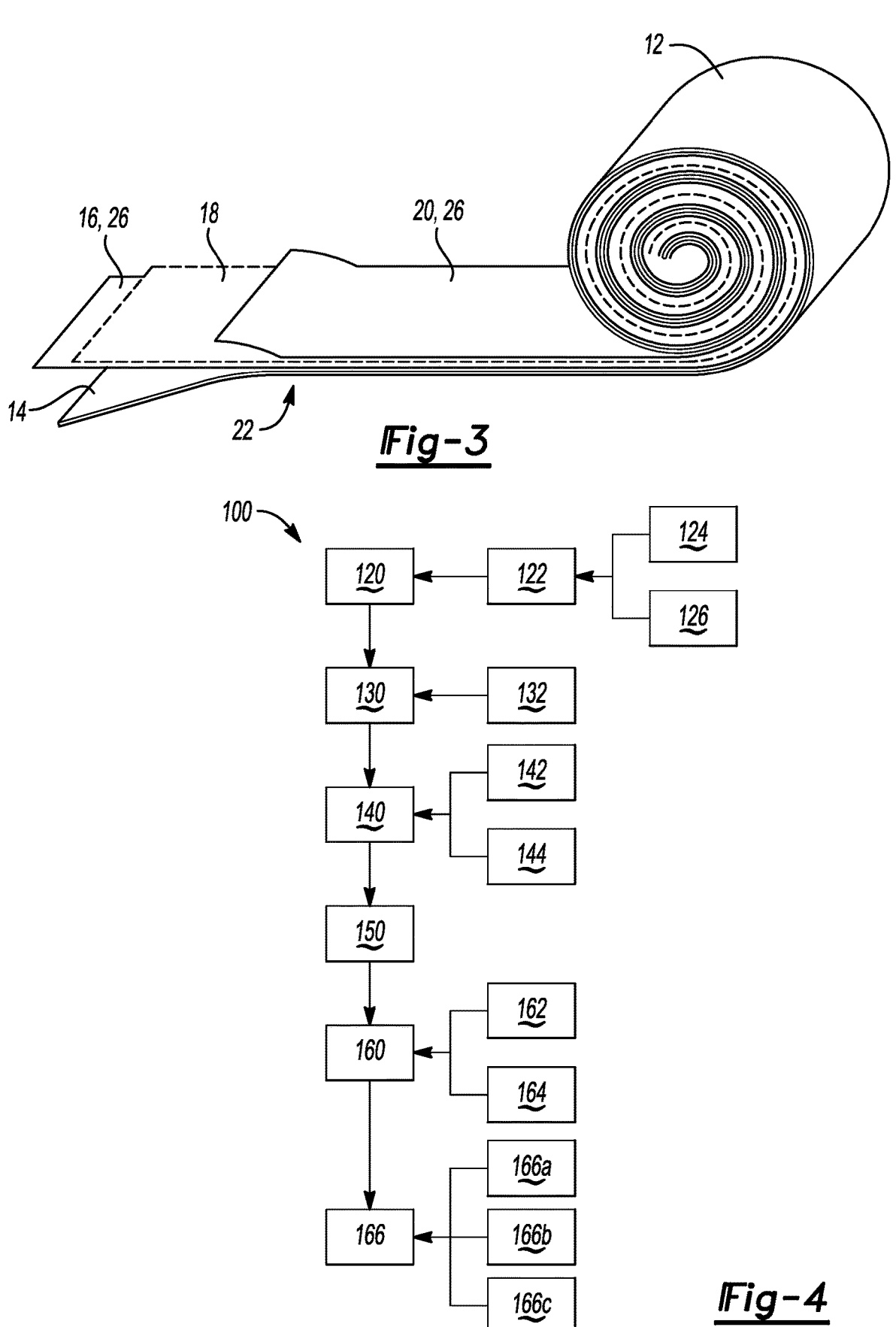
_Fig-3_
_Fig-4_

METHOD FOR REDUCING NON-UNIFORM ELECTRODE COATING DEGRADATION AND BATTERY CELLS COMPRISING THE SAME

INTRODUCTION

The concepts described herein relate to electrochemical energy storage battery cells including, but not limited to, stacked or wound, electrode designs for rechargeable cylindrical battery cells.

A lithium-ion battery is an electrochemical device that operates by passing lithium ions between a negative electrode (or anode) and a positive electrode (or cathode). The negative and positive electrodes are situated on opposite sides of a porous polymer separator that is soaked with an electrolyte solution suitable for conducting lithium ions.

DC power sources, such as lithium-ion batteries, may be employed to store and release electric power that may be employed by an electric circuit or an electric machine to perform work, such as for communications, display, or propulsion. Heat may be generated by the processes of converting electric power to chemical potential energy, i.e., battery charging, and converting chemical potential energy to electric power, i.e., battery discharging.

Operating a DC power source such as a lithium-ion battery outside of a desired temperature range may reduce battery service life. By way of example, lithium-ion technology may require operation within a temperature range between 15° C. and 35° C. to maximize service life of the battery. Operation of the lithium-ion battery outside of this temperature range may accelerate aging of the battery, reduce the service life of the battery, and/or reduce the energy storage capacity thereof.

Lithium-ion battery cells, including rechargeable cylindrical battery cells, may generate heat during charging, discharging, and under other conditions such as rapid recharging. Furthermore, apparent storage capacities of battery cells may be reduced under low ambient temperature conditions.

A jelly roll (JR) design is used in most rechargeable cylindrical battery cells. In this design, an insulating base is laid down, followed by an anode layer, a separator layer, and a cathode layer to form an electrode stack. The electrode stack is then rolled up into a cylinder and inserted into a hollow cylindrical casing.

When cylindrical battery cells undergo high-rate operation, for example, but not limited to, DC fast charging (DCFC), a temperature distribution may be induced across a radial direction of the jelly roll. The induced temperature distribution may result in non-uniform utilization of the jelly roll, which may result in higher fatigue and degradation of the electrode coating effectively decreasing the amount of charge the cylindrical battery cell can supply with repeated use, i.e. increasing the capacity fade of the cylindrical battery cell.

SUMMARY

Battery cells, including rechargeable cylindrical battery cells, may generate heat during charging, discharging, and under other conditions such as rapid recharging. Furthermore, storage capacities of battery cells may be reduced under low ambient temperature conditions.

A cylindrical battery cell includes a jelly roll (JR) design, which is used in most rechargeable cylindrical battery cells. In this design, an insulating base or separator, which is electrically insulating, is laid down, followed by a first electrode layer, for example, an anode layer, a separator layer, and a second electrode layer, for example, a cathode layer, to form an electrode stack, which is rolled up into a cylinder to form the jelly roll and inserted into a hollow cylindrical casing.

Electrode design characteristics are associated with each of the electrode layers, which may include but are not limited to, an electrode coating, a porosity, a loading and/or a particle size distribution, i.e. a fraction of inactive material in a slurry.

An aspect of the present disclosure includes a method of reducing non-uniform degradation in a battery cell including: determining a likely temperature distribution for the battery cell; determining a temperature profile of the battery cell; calculating an electrochemical reaction rate in the battery cell; determining at least one non-uniformity in the electrochemical reaction rate; inducing a non-uniformity in at least one electrode design characteristic to counteract the at least one non-uniformity in the electrochemical reaction rate; and including at least one electrode having the non-uniformity in at least one electrode design characteristic in the battery cell.

The non-uniformity in at least one electrode design characteristic, which is induced to counteract the at least one non-uniformity in the electrochemical reaction rate, drives a more uniform electrochemical reaction rate through the battery cell, which could result in decreased fatigue life, particle stress and degradation of the battery cell during, for example, but not limited to high rate operation.

The likely temperature distribution is determined based upon a high use case. In one non-limiting example, a high use case could be a DC fast charge (DCFC). In another non-limiting example, the high use case could be determined based on a tracked usage.

In one aspect of the disclosure, the battery cell is a cylindrical battery cell, and a temperature profile is determined in a radial direction. In one non-limiting example, an electrochemical reaction rate could be higher at or proximate to a center of the cylindrical battery cell. In another non-limiting example, an electrochemical reaction rate could be higher at or proximate to an outer diameter of the cylindrical cell.

The electrode design characteristic could be, for example, but not limited to, at least one of a porosity, a thickness and/or a loading.

The non-uniformity in at least one electrode design characteristic could be induced by controlling at least one electrode manufacturing process, which could include, but is not limited to, at least one of a line speed of a coater, a flow rate of a slurry and/or a calendaring pressure.

The loading could be, for example, but not limited to, at least one of a volume fraction of cathode material and/or a volume fraction of anode material.

In another aspect of the disclosure, an electrochemical battery cell includes at least one electrode having a non-uniformity in at least one electrode design characteristic that was induced to counteract at least one non-uniformity in an electrochemical reaction rate in the electrochemical battery cell.

In another aspect of the disclosure, an electrochemical battery cell includes at least one electrode having a non-uniformity in at least one electrode design characteristic, which is induced by controlling at least one electrode manufacturing process, for example, but not limited to a line speed of a coater, a flow rate of a slurry and/or a calendaring pressure.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

FIG. 1 generally illustrates a process for manufacturing a battery cell in accordance with the present disclosure.

FIG. 2 illustrates an example cylindrical battery cell constructed in accordance with the present disclosure.

FIG. 3 is an example jelly roll constructed in accordance with the present disclosure.

FIG. 4 is a flow chart describing a method for reducing non-uniform degradation in a battery cell in accordance with the present disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As generally illustrated in FIG. 1, a process for manufacturing a battery cell 10 includes: preparing a slurry 50; applying an electrode coating 60 to a base material; calendaring 70 the coated base material; cutting (not shown) the calendared coated base material into electrodes, in general, including anodes and/or cathodes, of a specified length depending on battery cell type, for example, but not limited to, a cylindrical battery cell.

As illustrated in FIGS. 2 and 3, a cylindrical battery cell 10, includes a jelly roll 12, which is used in most rechargeable cylindrical battery cells. In this design, an insulating base 14 is laid down, followed by a first electrode layer or anode 16, a separator layer 18, and a second electrode layer or cathode 20, to form an electrode stack 22, which is rolled up into a cylinder to form the jelly roll 12 and inserted into a hollow cylindrical casing or can 24.

Traditionally, as generally illustrated in FIG. 1, electrodes, for example, but not limited to, anodes 16 and cathodes 20, are produced by mixing an electrode material with water or an organic solvent to form a slurry that is applied to a top of a metal foil, to form an electrode coating. After the electrode coating is applied, the electrode is dried and pressed or "calendared."

Electrode design characteristics 26 are associated with each of the anode and cathode 16, 20, which may include but are not limited to, an electrode coating thickness, porosity, loading and/or a particle size distribution, i.e. the fraction of inactive material in a slurry.

In one aspect of the disclosure, a method of reducing non-uniform degradation 100 in a battery cell 10 includes inducing a non-uniformity 160 in at least one electrode design characteristic 26 to reduce non-uniform degradation 100 within the battery cell 10.

As illustrated in FIG. 4, a method of reducing non-uniform degradation 100 in a battery cell 10 includes: determining a likely temperature distribution 120 for the battery cell 10; determining a temperature profile 130 of the battery cell 10; calculating an electrochemical reaction rate 140 in the battery cell 10; determining at least one non-uniformity 150 in the electrochemical reaction rate 140; inducing a non-uniformity 160 in at least one electrode design characteristic 26 to counteract the at least one non-uniformity 150 in the electrochemical reaction rate 140; and including at least one electrode 16, 20 having the non-uniformity 160 in the at least one electrode design characteristic 26 in the battery cell 10.

The non-uniformity 160 in the at least one electrode design characteristic 26, induced to counteract the at least one non-uniformity 150 in the electrochemical reaction rate 140 in the battery cell 10, could drive a more uniform electrochemical reaction rate 140 through the battery cell 10 during, for example, but not limited to, a high rate operation, which can decrease fatigue life, particle stress and degradation.

The likely temperature distribution 120 is determined based upon a high use case 122. In one non-limiting example, a high use case 122 could be a DC fast charge (DCFC) 124. In another non-limiting example, the high use case 122 could be determined based on a tracked usage 126.

In one aspect of the disclosure, the battery cell 10 is a cylindrical battery cell and a temperature profile 130 is determined in a radial direction 132.

In one non-limiting example, an electrochemical reaction rate 140 could be higher at a center 142 of the cylindrical battery cell 10.

In another non-limiting example, an electrochemical reaction rate 140 could be higher at an outer diameter 144 of the cylindrical battery cell 10.

The electrode design characteristic 26 could be, for example, but not limited to, an electrode coating thickness, porosity, and/or a loading.

In one aspect of the disclosure, a non-uniformity in the at least one electrode design characteristic includes varying at least one of the electrode coating thickness, porosity and a loading.

In one aspect of the disclosure, a non-uniformity in the at least one electrode design characteristic includes varying at least of the electrode coating thickness, porosity and loading, while keeping another of the electrode coating thickness, porosity and loading constant.

In one, non-limiting example, the electrode coating thickness is held constant, while the porosity and the loading are varied.

In another, non-limiting example, the porosity is held constant, while the electrode coating thickness and the loading are varied.

In another, non-limiting example, the loading is held constant while the electrode coating thickness and the porosity are varied.

In one aspect of the disclosure, the non-uniformity in at least one electrode design characteristic 26 could be induced by controlling at least one electrode manufacturing process 166, which could include, but is not limited to, a line speed of a coater 166a, a flow rate of a slurry 166b or a calendaring pressure 166c.

In one, non-limiting example, the electrode coating thickness could be varied by controlling calendaring pressure 166c.

In another, non-limiting example, the porosity could be varied by controlling the line speed of the coater 166a, the flow rate of the slurry 166b and/or the calendaring pressure 166c.

In yet another, non-limiting example, the loading could be varied by controlling the line speed of the coater 166a or the flow rate of the slurry 166b.

In another aspect of the disclosure, an electrochemical battery cell 10 comprises at least one electrode 16, 20 having a non-uniformity 160 in at least one electrode design characteristic 26, wherein the non-uniformity 160 in the at least one electrode design characteristic 26 is induced to counteract at least one non-uniformity 150 in an electrochemical reaction 140 in the electrochemical battery cell 10.

The non-uniformity 160 in the at least one electrode design characteristic 26 is induced by: determining a likely temperature distribution 120 for the battery cell 10; determining a temperature profile 130 of the battery cell 10; calculating an electrochemical reaction rate 140 in the battery cell 10; determining at least one non-uniformity 150 in the electrochemical reaction rate 140; and inducing a non-uniformity 160 in at least one electrode design characteristic 26 to counteract the at least one non-uniformity 150 in the electrochemical reaction rate 140.

The likely temperature distribution 120 is determined based upon a high use case 122. In one non-limiting example, the high use case 122 could be a DC fast charge (DCFC) 124. In another non-limiting example, the high use case 122 could be determined based on a tracked usage 126.

In one aspect of the disclosure, a battery cell 10 is a cylindrical battery cell and a temperature profile 130 is determined in a radial direction 132, In one non-limiting example, an electrochemical reaction rate 140 could be higher at a center 142 of the cylindrical battery cell. In another non-limiting example, an electrochemical reaction rate 140 could be higher at an outer diameter 144 of the cylindrical cell.

The electrode design characteristic 26 could be, for example, but not limited to, a porosity, a thickness and/or a loading.

In one aspect of the disclosure, a non-uniformity 160 in the at least one electrode design characteristic 26 includes varying at least one of the electrode coating thickness, porosity and a loading 162.

In one aspect of the disclosure, a non-uniformity 160 in the at least one electrode design characteristic 26 includes varying at least of the electrode coating thickness, porosity and loading, while keeping another of the electrode coating thickness, porosity and loading constant 164.

In one aspect of the disclosure, the non-uniformity in at least one electrode design characteristic 26 could be induced by controlling at least one electrode manufacturing process 166, which could include, but is not limited to, a line speed of a coater 166a, a flow rate of a slurry 166b or a calendaring pressure 166c.

Accordingly, the non-uniformity 160 in the at least one electrode design characteristic 26, induced to counteract the at least one non-uniformity 150 in the electrochemical reaction rate 140 in the battery cell 10, could drive a more uniform electrochemical reaction rate 140 through the battery cell 10 during, for example, but not limited to, a high rate operation, which can decrease fatigue life, particle stress and degradation of the battery cell 10.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method of reducing non-uniform degradation in an electrochemical battery cell, comprising:
   including at least one electrode in the electrochemical battery cell, the at least one electrode having:
       a non-uniformity in at least one electrode design characteristic, wherein the at least one electrode design characteristic having the non-uniformity includes at least one of an electrode coating thickness, and an electrode coating loading,
       wherein the non-uniformity in the at least one electrode design characteristic is induced to counteract at least one non-uniformity in an electrochemical reaction rate in the electrochemical battery cell; and
       a uniformity in at least another electrode design characteristic, wherein the at least another electrode design characteristic having the uniformity includes an electrode coating porosity.

2. The method as recited in claim 1, wherein inducing the non-uniformity in the at least one electrode design characteristic includes:
   determining a likely temperature distribution for the electrochemical battery cell;
   determining a temperature profile of the electrochemical battery cell;
   calculating an electrochemical reaction rate in the electrochemical battery cell;
   determining at least one non-uniformity in the electrochemical reaction rate.

3. The method as recited in claim 2, wherein the likely temperature distribution is determined based upon a high use case.

4. The method as recited in claim 3, wherein the high use case is a DC fast charge.

5. The method as recited in claim 3, wherein the high use case is based on a tracked usage.

6. The method as recited in claim 2, wherein the battery cell is a cylindrical battery cell and the temperature profile is determined in a radial direction.

7. The method as recited in claim 6, wherein the electrochemical reaction rate is highest near a center of the cylindrical battery cell.

8. The method as recited in claim 6, wherein the electrochemical reaction rate is highest near an outer diameter of the cylindrical battery cell.

9. The method as recited in claim 2, wherein inducing the non-uniformity in the at least one electrode design characteristic includes varying at least one of a porosity, a thickness and a loading.

10. The method as recited in claim 2, wherein inducing the non-uniformity in the at least one electrode design characteristic includes varying at least one of the electrode coating thickness and the electrode coating loading, while keeping the electrode coating porosity.

11. The method as recited in claim 2, wherein inducing the non-uniformity in the at least one electrode design characteristic including controlling at least one electrode manufacturing process, wherein the at least one electrode manufacturing process includes one of a calendaring pressure, a line speed of a coater, and a flow rate of a slurry.

12. An electrochemical battery cell, comprising:
   at least one electrode having:
      a non-uniformity in at least one electrode design characteristic, wherein the at least one electrode design characteristic having the non-uniformity includes at least one of an electrode coating thickness, and an electrode coating loading,
      wherein the non-uniformity in the at least one electrode design characteristic is induced to counteract at least one non-uniformity in an electrochemical reaction rate in the electrochemical battery cell; and
      a uniformity in at least another electrode design characteristic, wherein the at least another electrode design characteristic having the uniformity includes an electrode coating porosity.

13. The electrochemical battery cell as recited in claim 12, wherein inducing the non-uniformity in the at least one electrode design characteristic includes:

determining a likely temperature distribution for the electrochemical battery cell;
   determining a temperature profile of the electrochemical battery cell;
   calculating the electrochemical reaction in the electrochemical battery cell; and
   determining the at least one non-uniformity in the electrochemical reaction rate.

14. The electrochemical battery cell as recited in claim 13, wherein the likely temperature distribution is determined based upon a high use case.

15. The electrochemical battery cell as recited in claim 13, wherein the electrochemical battery cell is a cylindrical battery cell and the temperature profile is determined in a radial direction.

16. The electrochemical battery cell as recited in claim 15, wherein the electrochemical reaction rate is highest near a center of the cylindrical battery cell.

17. The electrochemical battery cell as recited in claim 15, wherein the electrochemical reaction rate is highest near an outer diameter of the cylindrical battery cell.

18. The electrochemical battery cell as recited in claim 12, wherein inducing the non-uniformity in the at least one electrode design characteristic includes varying at least one of a porosity, a thickness and a loading.

19. The electrochemical battery cell as recited in claim 12, wherein inducing the non-uniformity in the at least one electrode design characteristic includes varying the at least one of the electrode coating thickness and the electrode coating loading, while keeping the electrode coating porosity constant.

20. The electrochemical battery cell as recited in claim 12, wherein inducing the non-uniformity in the at least one electrode design characteristic includes controlling at least one electrode manufacturing process, wherein the at least one electrode manufacturing process includes one of a calendaring pressure, a line speed of a coater, and a flow rate of a slurry.

* * * * *